United States Patent [19]

Lowe

[11] Patent Number: 5,007,256
[45] Date of Patent: Apr. 16, 1991

[54] CARTRIDGE OPERATED ENTERTAINMENT SYSTEM WITH REMOVAL DETERRENT DEVICE FOR PREVENTING UNAUTHORIZED USE

[76] Inventor: Thomas E. Lowe, 35W528 Parsons, Dundee, Ill. 60118

[21] Appl. No.: 409,682

[22] Filed: Sep. 20, 1989

[51] Int. Cl.$^5$ ............................................. E05B 73/00
[52] U.S. Cl. ........................................... 70/14; 70/58; 211/4; 248/553
[58] Field of Search ................. 70/14, 57, 58, 159, 70/163, 164, 19, 258; 211/4; 248/551, 552, 553

[56] References Cited

U.S. PATENT DOCUMENTS

| | | | |
|---|---|---|---|
| 3,667,260 | 6/1972 | Foote | 70/159 |
| 3,771,338 | 11/1973 | Raskin | 70/58 |
| 4,028,913 | 6/1977 | Falk | 70/58 |
| 4,551,999 | 11/1985 | Guiler | 70/159 |
| 4,655,057 | 4/1987 | Derman | 70/58 X |
| 4,709,567 | 12/1987 | Appelbaum | 70/455 |
| 4,856,304 | 8/1989 | Derman | 70/58 X |

FOREIGN PATENT DOCUMENTS

| | | | |
|---|---|---|---|
| 108567 | 1/1928 | Austria | 70/26 |
| 562134 | 11/1957 | Belgium | 70/58 |
| 319122 | 2/1920 | Fed. Rep. of Germany | 70/58 |
| 70431 | 5/1946 | Norway | 70/58 |

*Primary Examiner*—Lloyd A. Gall
*Attorney, Agent, or Firm*—Leydig, Voit & Mayer

[57] ABSTRACT

A cartridge-operated entertainment system having a cartridge receiving opening in a front side thereof and a removable deterrent device for preventing unauthorized use of the system. The deterrent device includes a base with a first upstanding leg for removable engagement with an aperture in the underside of the housing and a second upstanding leg positionable in adjacent relation to the cartridge receiving opening for preventing insertion of a cartridge into the opening when said first leg is engaged with the housing. A removable locking head is positionable and lockable on an upstanding end of the second leg for preventing disengagement of the first leg from the housing aperture, and thus removal of the second leg from its obstructing position adjacent the cartridge receiving opening. The system includes an access door that is movable between an open position for permitting access to the cartridge receiving opening and a closed position for covering the cartridge receiving opening, and a flexible shield is secured to the underside of the access door for covering the cartridge receiving opening when said deterrent device isused with the door in an open position and when the door is otherwise inadvertently left in an open position. In a second embodiment, the locking head is directly engagable with the access door for retaining the door in a closed position and for preventing access to the cartridge receiving opening.

23 Claims, 4 Drawing Sheets

CARTRIDGE OPERATED ENTERTAINMENT SYSTEM WITH REMOVAL DETERRENT DEVICE FOR PREVENTING UNAUTHORIZED USE

BACKGROUND OF THE INVENTION

1. Field of the Invention

The present invention relates generally to cartridge or disc operated computer and entertainment systems, and more particularly, to systems of such type that have deterrent devices for preventing unauthorized use thereof.

2. Description of the Prior Art

Many computer game and entertainment systems, such as the presently popular system sold under the name NINTENDO, are operated for countless hours by children, to the extent that their time for studies and household chores can be adversely affected. While parents may impose limitations on the period of use of such entertainment systems, these limitations can be easily forgotten or ignored. Likewise, parents frequently desire to prevent operation of videocassette players, particularly during their absence, so as to avoid the use of videocassettes which may be unsuitable for children's viewing, or again, simply to prevent the unlimited use of the entertainment system. While various types of deterrent devices have been proposed for preventing unauthorized use of such entertainment systems, these prior devices typically have been relatively complicated and difficult to use, or must be incorporated into the original design of the entertainment system so as not to be easily applicable to existing systems.

In addition, users of such computer game and entertainment systems, and particularly children, frequently inadvertently leave the access door to the system in an open position during periods of non-use. With the access door left open, dust and other foreign matter may accumulate about the cartridge or disc receiving opening of the system, which may lead to possible contamination and malfunctioning of the operating mechanisms of the system.

3. Objects and Summary of the Invention

It is an object of the present invention to provide the cartridge or disc operated entertainment system with relatively simple and inexpensive deterrent means for preventing unauthorized use of the system.

Another object is to provide a deterrent device that is particularly adapted for preventing unauthorized use of NINTENDO entertainment systems.

A further object is to provide a cartridge or disc operated entertainment system with shielding means for protecting the disc or cartridge receiving access opening of the system from dust or other foreign matter in the event the access door to the system is left open for extended periods of time.

Still another object is to provide a deterrent device and shielding means as characterized above which are adaptable for use with existing entertainment systems.

Yet another object is to provide a deterrent device of the foregoing type that is operable for preventing unauthorized use of the entertainment system and for locking the access door thereof in a closed position for protecting the access opening of the system from dust and foreign matter during periods of non-use.

Other objects and advantages of the invention will become apparent upon reading the following detailed description and upon reference to the drawings, in which:

Figure 1:
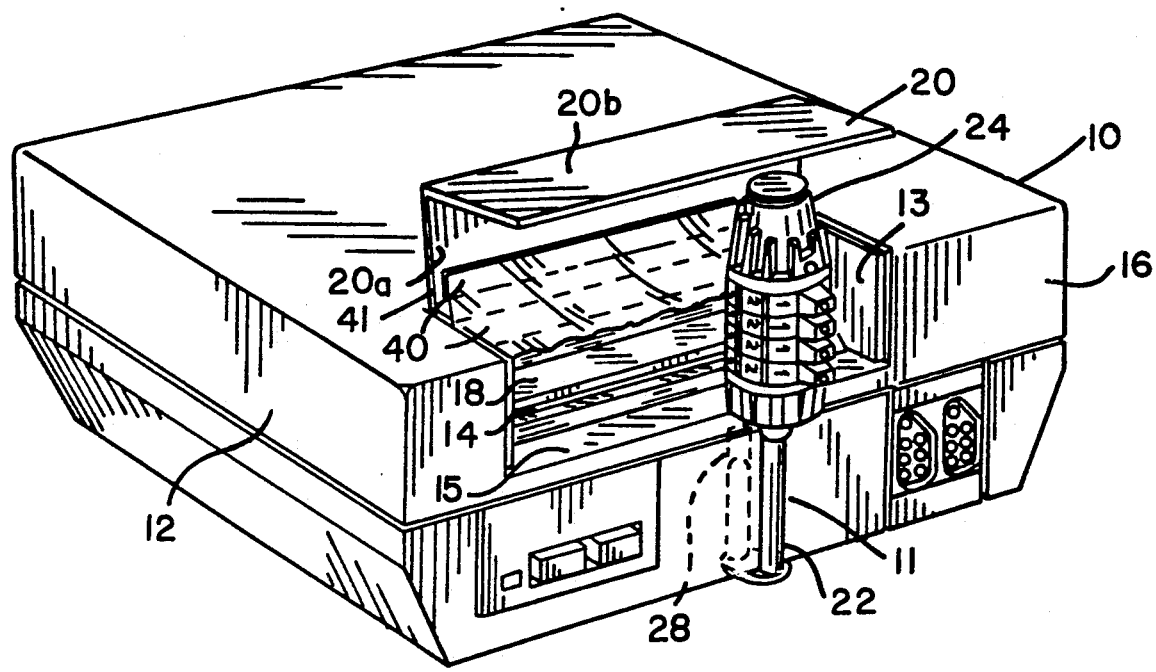
FIG. 1 is a perspective of an illustrative cartridge operated entertainment system having a removable deterrent device and shielding means in accordance with the present invention, the shielding means being shown in partially broken away condition.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DESCRIPTION OF PREFERRED EMBODIMENTS

Referring now more particularly to FIG. 1 of the drawings, there shown an illustrative entertainment system 10 having a deterrent device 11 embodying the invention. The entertainment system 10 in this case is a cartridge-operated computer game of the type commercially sold under the name NINTENDO and comprises an outer, generally box-like housing 12 having a forwardly-directed, horizontal, slit-like access opening 14 through which a selected cartridge may be inserted into the housing for programming the system for the desired game to be played. The upper forward corner of the housing 12 in this instance is formed with a recess 13 which defines a horizontal wall 15 extending rearwardly from a front face 16 of the housing and a generally vertical wall 18 extending upwardly from the horizontal wall 15 in rearwardly spaced relation to the front face 16. The cartridge access opening 14 is formed in the recessed front wall 18 and is adapted to receive cartridges which are inserted horizontally through the opening 14. An L-shaped door 20 is mounted on a hinge 21 at the top of the recessed wall 18 for closing the cartridge access opening 14 following the insertion of a cartridge into the opening, or during periods of non-use when there is no need or desire to prevent unauthorized use of the system. The door 20 in this case is defined by a first panel 20a that is horizontally positionable when the door is closed and a second panel 20b extending in depending fashion from the first panel 20a when the door is in a closed condition for defining a forward, upper corner of the housing. Since such NINTENDO computer game-type entertainment systems are commercially available, their operating details need not be disclosed since they form no part of the invention.

While the invention will be described in connection with such a NINTENDO computer-type game, it will be understood that the invention is similarly applicable to video cassette recorders and players, and other cartridge, disc, or cassette-operated entertainment and computer systems. As used herein, the term "cartridge" is intended to mean floppy discs, hard discs, cassettes, videotapes and the like which are insertable into the access opening of a computer, entertainment, or like system for programming the system or otherwise permitting it to be rendered operative.

In accordance with the invention, the deterrent device includes (1) a base member having first means that is removably engageable with the housing of the system and second means positionable in obstructing, forwardly-spaced relation to the cartridge receiving opening of the housing for preventing insertion of a cartridge into the inlet opening when said first means is engaged with the housing, and (2) a removable locking head that is selectively engageable and lockable on said second means for preventing disengagement of the first means from said housing. In the illustrated embodiment, the deterrent device 11 includes a base member 22 and a removable locking head 24. The base member 22 has a base plate 25 with a first upstanding leg 26 for removable insertion into an aperture 28 in the underside of the housing 12 and a second leg 30 mounted in forwardly spaced relation to the first leg 26 for positioning in upstanding relation adjacent a forward side of the cartridge receiving opening 14 when the first leg 26 is in engagement with the housing. The first leg 26 has a generally tapered upper end portion 31 to facilitate positioning into the housing aperture 28. The base plate 25 is preferably sized such that upon positioning the first leg 26 into the housing aperture 28 the forwardly spaced second leg 30 is located in relatively closely adjacent relation to the front face 16 of the housing 12. The second leg 30 in this instance has a length corresponding substantially to the height of the housing 12, such that the upper end portion thereof is disposed immediately adjacent the cartridge receiving opening 14 so as to form an obstruction preventing insertion of a cartridge into the opening 14.

In keeping with the invention, the locking head 24 is a cylindrical configured combination lock that can be selectively locked on the upstanding end of the second leg 30 for preventing disengagement of the first leg 26 from the housing aperture 28, and, thus, preventing removal of the second leg 30 from its obstructing position in front of the cartridge receiving opening 14. The locking head 24, which may be of a type which is commercially available from the Master Lock Co., Milwaukee, Wis., in this instance has four annular discs 34 bearing numerical indicia, with the zero position of each disc being formed on a radially-extending tab to facilitate selected rotational positioning of the disc. The upstanding end of the second leg 30 of the base member 22 is formed with a plurality of equally-spaced annular notches or grooves 35, in number and spacial relation to the annular discs 34 of the locking head 24. To properly position the locking head 24 on the upstanding leg 30 such that the discs 34 are concentrically positioned about respective notches 35, the upstanding leg 30 is formed with an annular seat 36 defined by a reduced diameter upper portion 38 of the leg within which the locking notches or grooves are formed. The locking head 24 is positionable onto the reduced diameter portion 38, with the seat 36 establishing its proper position, and may be locked in such position by randomly rotating the discs 34. As is known in the art, such locks may have a resettable unlocking combination to permit changing of the combination if desired.

When it is desired to prevent the unauthorized use of the entertainment system 10, the base member 22, with the locking head 24 removed therefrom, may be positioned such that the first leg 26 is engaged in the aperture 28 on the underside of the housing 12 and the second leg 30 extends upwardly in forwardly spaced, obstructing relation to the access opening 14. With the base member 22 in such position and with the access door 20 raised, the locking head 24 may be positioned onto and locked on the upstanding end portion 38 of the base member 22 so as to both prevent removal of the deterrent device 11 from the housing 12 and prevent insertion of cartridges into the access opening 14. By dialing the appropriate combination, the locking head 24 may be removed from the base member 22 and the base member 22 removed from the housing 12 so as to permit normal use of the entertainment system 10.

It will be appreciated that since NINTENDO entertainment systems commonly are manufactured with an aperture 28 in the underside of the housing, the deterrent device 11 may be used on new or existing systems of such type. In the event the housing of the entertainment system does not include such aperture, an aperture may be easily formed in the underside of the housing. Alternatively, other means for engaging the base member to the housing could be employed.

Figure 2:
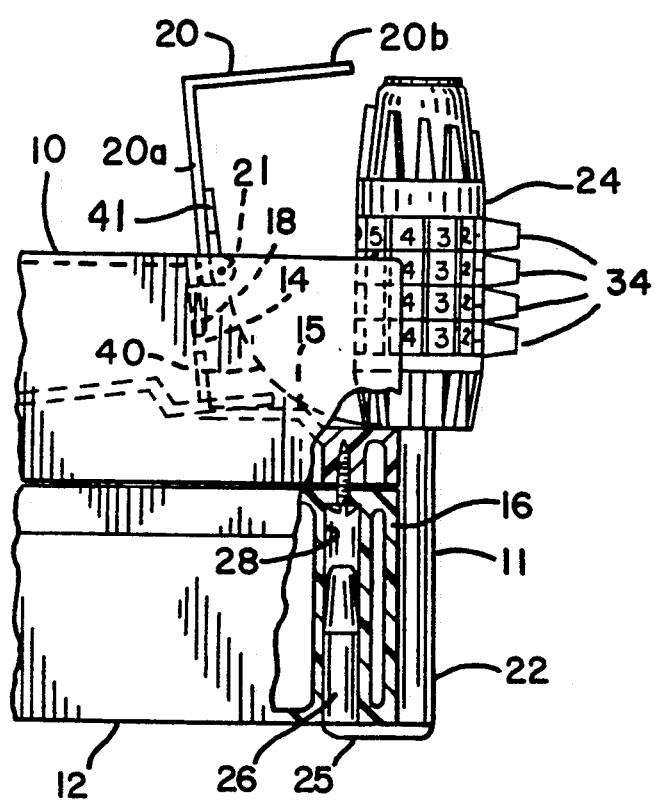
FIG. 2 is an enlarged side elevation view, in partial section, showing the deterrent device in assembled condition on the illustrated entertainment system.
Figure 3:
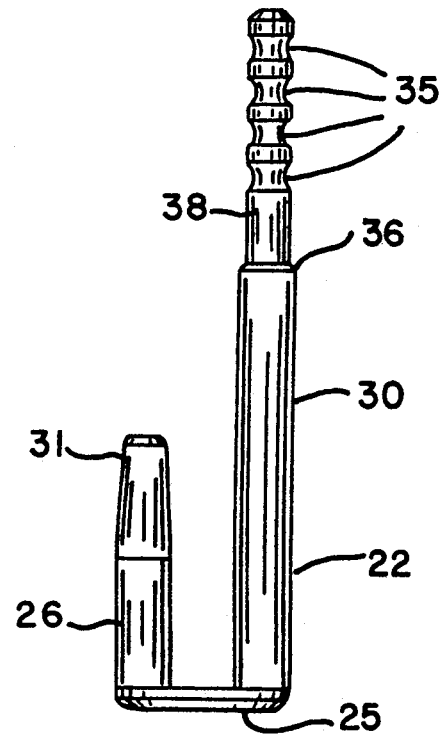
FIG. 3 an enlarged side elevational view of the base member of the illustrated deterrent device with the locking head thereof removed.
Figure 4:
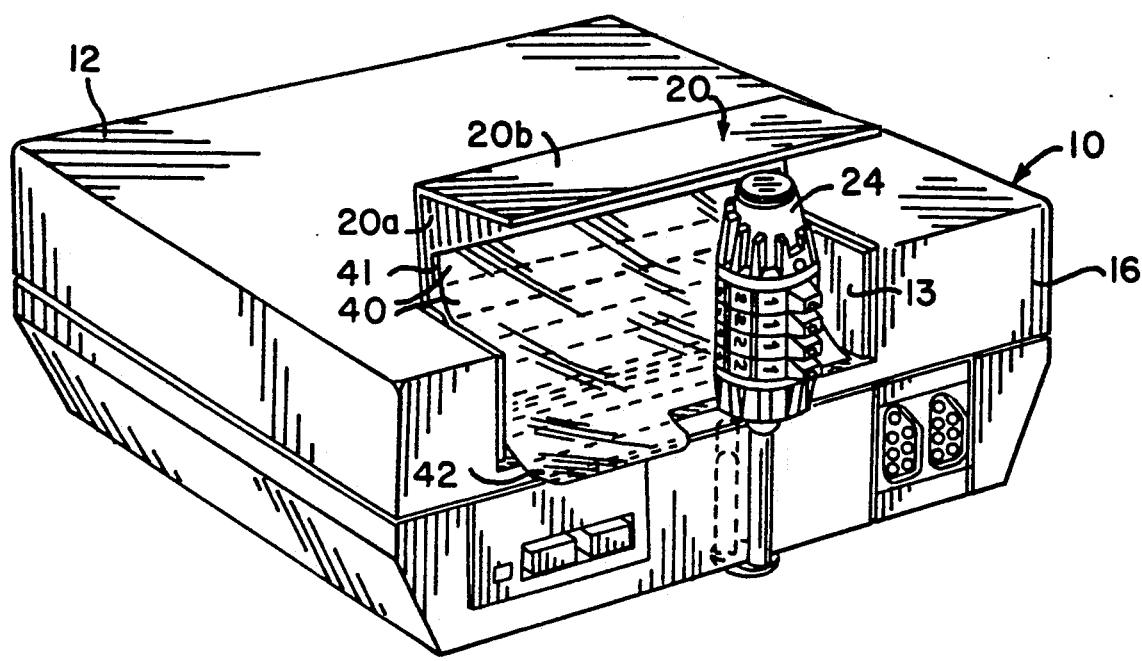
FIG. 4 is a perspective of the illustrated system, similar to FIG. 1, showing the deterrent device in mounted position and the shielding means protecting the cartridge access opening of the system from dust and other contaminants.
Figure 5:
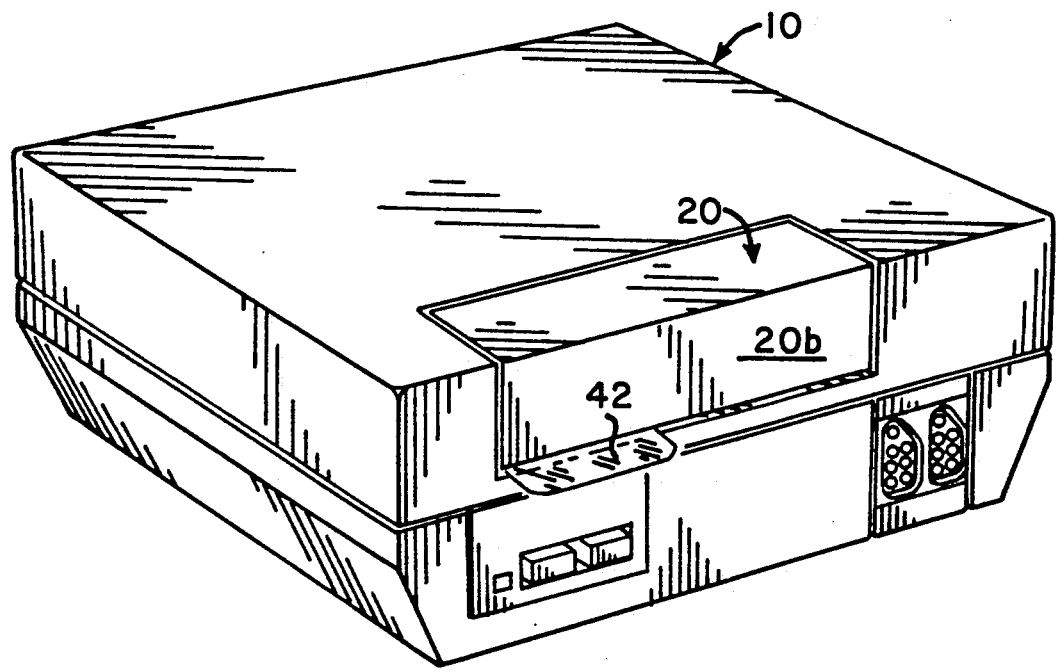
FIG. 5 is a perspective of the illustrated system with the deterrent device removed and the access door to the system closed.
Figure 6:
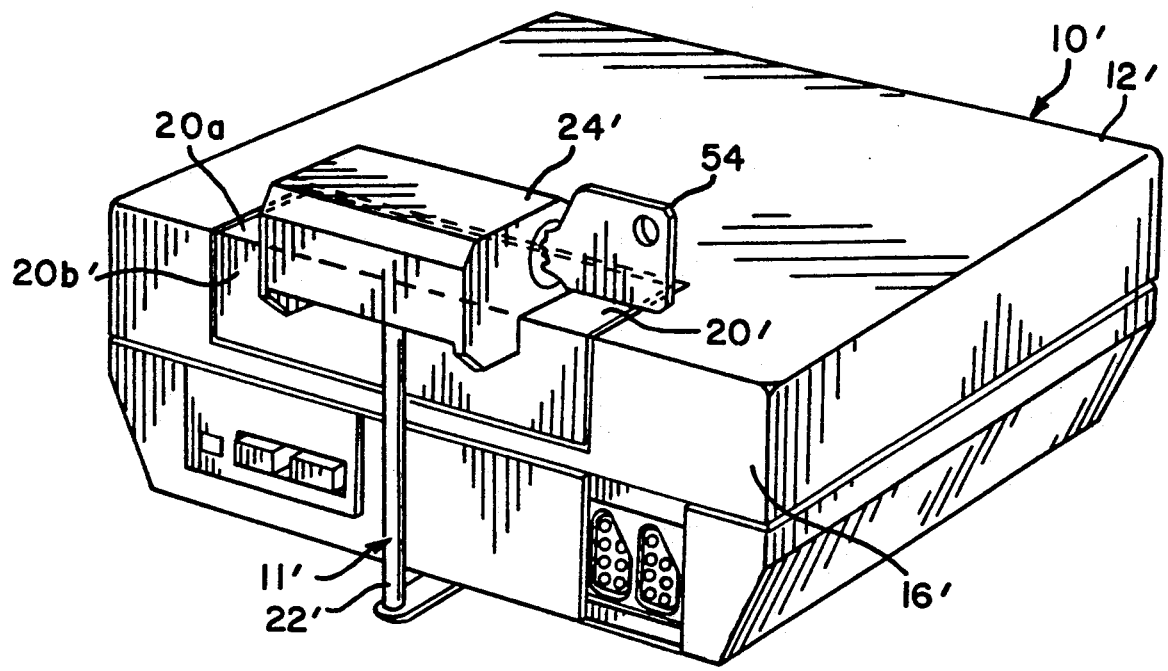
FIG. 6 is a perspective of an entertainment system, similar to that shown in FIG. 1, but equipped with an alternative form of deterrent device embodying the present invention.
Figure 7:
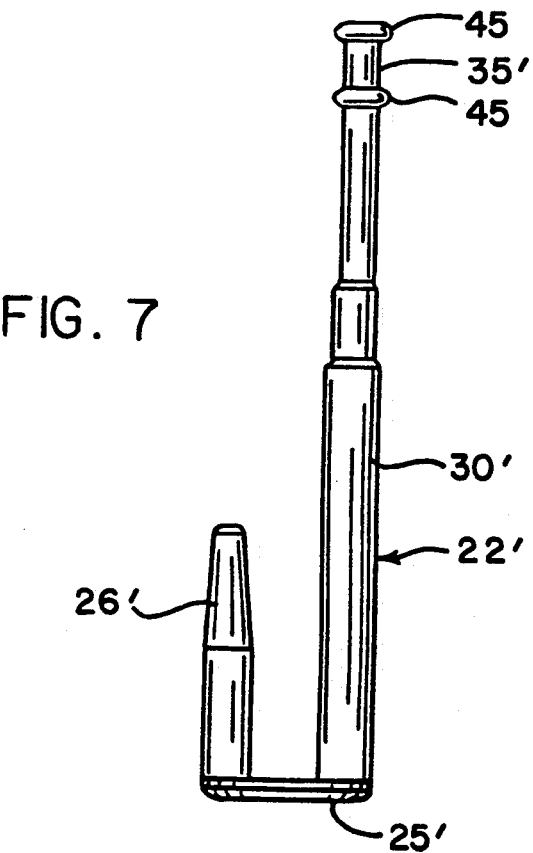
FIG. 7 is an enlarged side elevational view of the base member of the deterrent device shown in FIG. 6.
Figure 8:
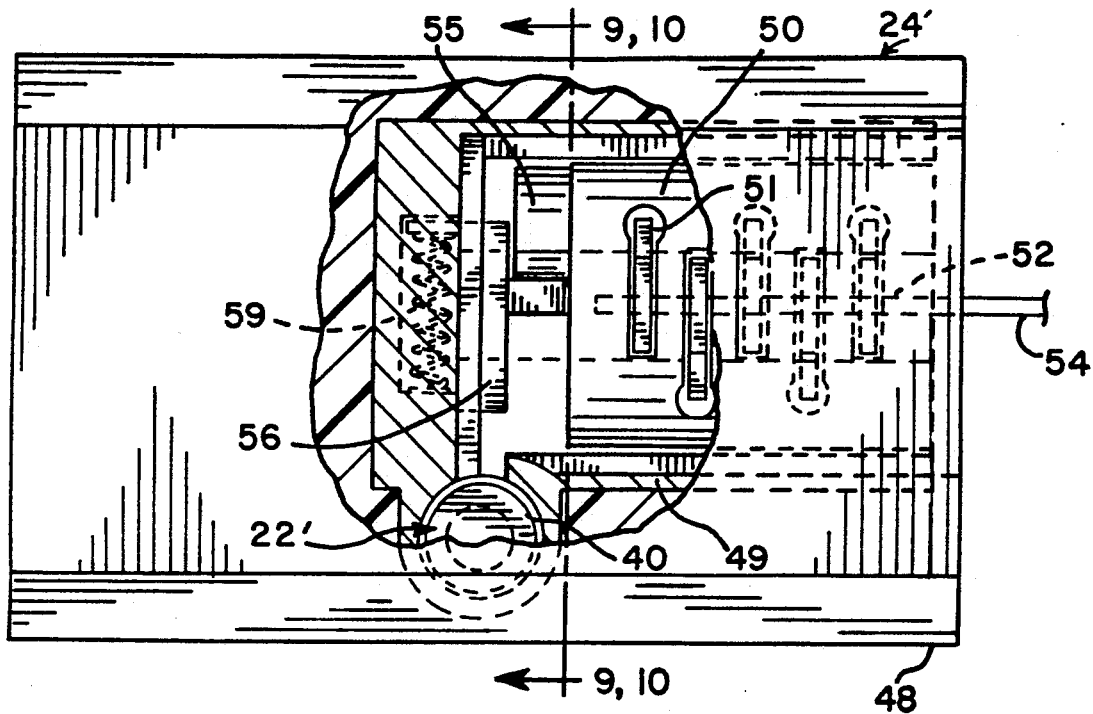
FIG. 8 is a top view of the deterrent device shown in FIG. 6.
Figures 9, 10:
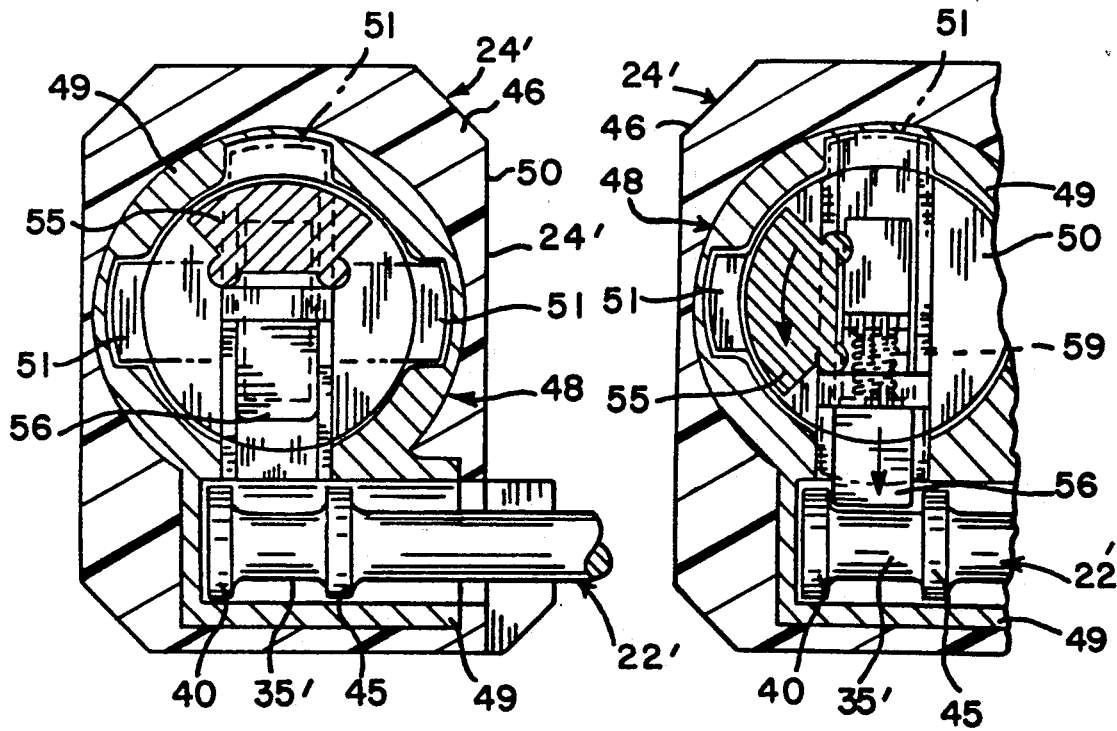
FIG. 9 is vertical section taken in the plane of line 9—9 in FIG. 8.
FIG. 10 is a fragmentary section taken in the plane of line 10—10 in FIG. 8.

In carrying out a further feature of the invention, shielding means is provided for protecting the cartridge access opening of the system from dust and foreign matter when the locking device is in use, or when the access door is inadvertently left in an open position during periods of non-use of the system. To this end, in the illustrated embodiment, a flexible plastic shield 40, substantially coexistent with the width of the door 20 is secured to the underside of the door such that when the door is in an open position, as shown in FIGS. 1, 2 and 4, the shield 40 completely encloses the recess 13 to protect the access opening 14 from foreign matter. The shield 40 preferably is made of mylar or other plastic material which permits flexing or bending when stressed, but which will resume its normal substantially flat condition when in an unstressed condition. For securing the shield to the underside of the door, a double sided adhesive strip 41 is affixed between one side of the shield adjacent an upper end thereof and the underside of the first door panel 20a. With the upper end of the shield 40 adhesively affixed to the underside of the door panel 20a in such manner, when the door is in an open condition, as shown FIGS. 1 and 2, the shield extends in an inwardly curved fashion between the underside of the door panel 20a and the horizontal housing wall 15 so as to completely encompass the housing recess 13. The lower end of the shield 40 in this case is formed with a tab 42 which extends outwardly beyond the front face 16 of the housing 12 for permitting easy lifting of the shield to enable insertion and removal of cartridges into and from the access opening 14. The tab 42 preferably extends less than the entire width of the door so as not to impede installation of the locking device 11. By virtue of the flexibility of the shield 40, however, the locking device may be mounted directly on the lower end of the shield if desired. Hence, during periods when the locking device is installed, or when the door is otherwise inadvertently left in an open condition, the shield 40 effectively prevents dust or other foreign matter from accumulating on or about the access opening 14. Upon removal of the locking device, the door may be lowered to its closed position, with the shield being forced into a smaller curved configuration under the door with only the retaining tab 42 extending outwardly therefrom, as shown in FIG. 5.

Referring now to FIGS. 6-10 there is shown a cartridge operated entertainment system 10' having an alternative form of deterrent device 11', wherein items similar to those described above have been given similar reference numerals with distinguishing suffix " " " " added. The entertainment system 10' is a cartridge operated entertainment system identical to that previously described, and the deterrent device 11' in this case is adapted for both preventing access to the entertainment system and for locking the access door 20' thereof in a closed position. The deterrent device 11' again includes a base member 22' and a locking head 24'. The base member 22' has a base plate 25' with a first upstanding leg 26' for removable insertion into an aperture in the underside of the entertainment system housing 12', similar to that previously described, and a second leg 30' mounted in forwardly spaced relation to the first leg 26' adjacent to the front side 16' of the housing 12'. The second leg 30' in this instance extends to an elevation substantially above the height of the housing 12' and is formed with a pair of axially spaced radial flanges 45 which define a lock receiving radial groove 35'.

In carrying out this embodiment of the invention, the locking head 24' is operable for releasably engaging the upper end of the second base member leg 30' while the access door 20' of the entertainment system is in a closed position for preventing access to the cartridge receiving opening of the system and for locking the door in a closed position. The locking head 24' in this case is a key operated locking device of a conventional type. The illustrated locking head 24' has an outer housing 46 which contains a cylindrical key operated lock 48. The lock 48 includes a cylindrical casing 49 fixed within the housing 46 and a plug 50 adapted for relative rotational movement within the casing 49. The plug 50 has a set of key operable tumblers 51 of a conventional type which are slidably carried by the plug and which intersect a key slot 52 therein. When a key 54 is inserted into the key slot 52, the tumblers 51 are shifted so that the ends are appropriately aligned with the periphery of the plug 50 for enabling rotation of the plug 50 into and out of locked positions. The plug 50 has an eccentrically mounted stub 55 at its axial end adapted for moving a locking plunger 56. The locking plunger 56 is mounted in a transverse bore and is biased toward a retracted or unlocked position by a spring 59. Rotation of the plug 50 and the stub 55 carried thereon to the locked position upon rotation of the key 54, in turn, causes the plunger to be moved transversely against the force of the spring 59 from the retracted position, shown in FIG. 9, to a locked position shown in FIG. 10. With the access door 20' in a closed position and the locking head mounted on and secured to the top of the upstanding leg 30' of the base member 25', unauthorized access to the cartridge receiving opening of the system is prevented and the door 20' is retained in a closed position for protecting the access opening from dust and foreign matter during periods of non-use.

We claim as our invention:

1. A cartridge-operated entertainment system comprising:
    a housing having a cartridge receiving access opening,
    a removable deterrent device for preventing unauthorized use of said entertainment system,
    said deterrent device comprising a base with first means removably engageable with said housing and second means positionable adjacent said access opening for preventing insertion of a cartridge into said opening when said first means is engaged with said housing,
    a removable locking head selectively positionable and lockable on said second means for preventing disengagement of said first means from said housing,
    said housing including a door that is selectively movable between an open position for permitting access to said cartridge receiving access opening and a closed position, and
    a flexible shield secured to an underside of said door for covering and protecting said cartridge receiving access opening from dust and other foreign matter when said deterrent device base is engaged with said housing and said cover is in an open position.

2. The entertainment system of claim 1 in which said door is movable to and retained in said open position upon engagement of said deterrent device base with said housing.

3. A deterrent device for use with a cartridge operated entertainment system having a housing with a cartridge receiving access opening in a side thereof comprising a base with first means removably engageable with said housing at a location outside of said access opening and second means positionable in outwardly adjacent relation to said opening for preventing insertion of a cartridge into said opening when said first means is engaged with said housing, and a removable locking head selectively positionable and lockable on said second means for preventing disengagement of said first means from said housing.

4. The entertainment system of claim 3 in which said base is a generally U-shaped member with said first means being one leg thereof and said second means being another leg thereof disposed in generally parallel relation to said first leg.

5. The entertainment system of claim 3 in which said base includes a base plate and said first means is a first leg extending in upstanding relation to said base plate and said second means is a second leg extending in upstanding relation to said base plate.

6. The entertainment system of claim 5 in which said second leg is longer than said first leg.

7. The entertainment system of claim 6 in which said locking head is a cylindrical combination lock.

8. The entertainment system of claim 7 in which said second leg is formed with a plurality of spaced locking notches, and said locking head has a plurality of selectively rotatable locking discs corresponding in number and spacing to said locking notches.

9. The entertainment system of claim 8 in which said second leg is formed with a seat for locating said locking head in predetermined position on said second leg.

10. A cartridge-operated entertainment system comprising:
a housing having a cartridge receiving access opening,
a removable deterrent device for preventing unauthorized use of said entertainment system,
said deterrent device comprising a base with first means removably engageable with said housing at a location outside of said access opening and second means positionable in outwardly adjacent relation to said access opening for preventing insertion of a cartridge into said opening when said first means is engaged with said housing, and
a removable locking head selectively positionable and lockable on said second means for preventing disengagement of said first means from said housing.

11. The entertainment system of claim 10 including a flexible shield covering said cartridge receiving opening when said deterrent device base is engaged with said housing.

12. The entertainment system of claim 10 in which said access opening is in a front side of said housing.

13. The entertainment system of claim 12 in which said housing is formed with an aperture on an underside thereof, and said first means is positionable into said housing aperture.

14. The entertainment system of claim 10 in which said base is a generally U-shaped member with said first means being one leg thereof and said second means being another leg thereof disposed in generally parallel relation to said first leg.

15. The entertainment system of claim 13 in which said base includes a base plate and said first means is a first leg extending in upstanding relation to said base plate for selective positioning in said housing aperture and said second means is a second leg extending in upstanding relation to said base plate in forwardly spaced relation to said cartridge receiving opening when said first leg is in engagement with said aperture.

16. The entertainment system of claim 15 in which said second leg is longer than said first leg.

17. The entertainment system of claim 15 in which said locking head is a cylindrical combination lock.

18. The entertainment system of claim 17 in which said second leg has a portion formed with a plurality of spaced locking notches, and said locking head has a plurality of selectively rotatable locking discs corresponding in number and spacing to said locking notches.

19. The entertainment system of claim 18 in which said second leg is formed with a seat of larger diameter than the portion thereof formed with said notches for locating said locking head in predetermined position on said second leg.

20. The entertainment system of claim 19 in which said first leg has a tapered upper end portion for facilitating positioning in said housing aperture.

21. The entertainment system of claim 20 in which said second leg is formed with an upper reduced diameter portion on which said locking notches are formed.

22. The entertainment system of claim 15 in which said housing is formed with a recess in an upper front corner thereof which defines a recessed front wall within which said cartridge receiving opening is formed, and said second leg extends upwardly in adjacent relation to said recess when said first leg is in engagement with said housing.

23. The entertainment system of claim 22 in which said recess defines a horizontal wall extending rearwardly from a front side of said housing, and said locking head is positionable onto and lockable on said second leg in close relation to said horizontal wall.

* * * * *